US012290920B2

(12) United States Patent
Kastler et al.

(10) Patent No.: US 12,290,920 B2
(45) Date of Patent: May 6, 2025

(54) ARM MODULE FOR A MODULAR ROBOT ARM OF AN INDUSTRIAL ROBOT

(71) Applicant: Beckhoff Automation GmbH, Verl (DE)

(72) Inventors: Peter Kastler, Vienna (AT); Clemens Maier, Bludenz (AT); Christoph Zech, Mödling (AT); Thomas Morscher, Vienna (AT); Armin Pehlivan, Nüziders (AT); Michael Jäger, Bürs (AT); Peter Fischer, Hartberg (AT); Thomas Rettig, Rheda-Wiedenbrück (DE); Thorsten Bunte, Gütersloh (DE); Christopher Pohl, Verl (DE)

(73) Assignee: Beckhoff Automation GmbH, Verl (DE)

( * ) Notice: Subject to any disclaimer, the term of this patent is extended or adjusted under 35 U.S.C. 154(b) by 92 days.

(21) Appl. No.: 17/991,048

(22) Filed: Nov. 21, 2022

(65) Prior Publication Data

US 2023/0082028 A1    Mar. 16, 2023

Related U.S. Application Data

(63) Continuation of application No. PCT/EP2021/065422, filed on Jun. 9, 2021.

(30) Foreign Application Priority Data

Jun. 10, 2020 (DE) ............... 10 2020 115 448.8

(51) Int. Cl.
*B25J 19/02* (2006.01)
*B25J 9/00* (2006.01)
(Continued)

(52) U.S. Cl.
CPC ......... *B25J 17/0233* (2013.01); *B25J 9/0009* (2013.01); *B25J 9/0048* (2013.01);
(Continued)

(58) Field of Classification Search
CPC . H04B 3/60; B25J 19/021; B25J 13/08; B25J 9/047; B25J 9/0048; B25J 9/0009; B25J 17/0233
(Continued)

(56) References Cited

U.S. PATENT DOCUMENTS 5,069,524 A   12/1991   Watanabe et al.
5,712,552 A   1/1998    Hirai et al.
(Continued)

FOREIGN PATENT DOCUMENTS

CN   108789476 A   11/2018
CN   110370261 A   10/2019
(Continued)

OTHER PUBLICATIONS

International Preliminary Report on Patentability dated Sep. 12, 2022 in connection with PCT/EP2021/065422, 30 pages including English translation.
(Continued)

*Primary Examiner* — T. Scott Fix
(74) *Attorney, Agent, or Firm* — Dorsey & Whitney LLP

(57) ABSTRACT

An arm module includes a housing with a first connection side controllably rotatable relative to a second connection side, about an axis of rotation. The first connection side has a rotatable first connection device. The second connection side has a second connection device fixed to the housing, with a rotation-compatible data transmission device for transmitting data signals along at least one transmission path between the first and second connection sides. The transmission path includes at least one wireless transmission
(Continued)

sub-path for wireless transmission of data signals, and at least one wire-guided transmission sub-path for wire-guided transmission of data signals. The rotation-compatible data transmission device includes at least one first wireless transmission unit and at least one second wireless transmission unit, interconnected via the transmission path and arranged to wirelessly transmit and receive data signals along the wireless transmission sub-path. An industrial robot can have a plurality of such arm modules.

16 Claims, 11 Drawing Sheets

(51) Int. Cl.
    *B25J 9/04*          (2006.01)
    *B25J 13/08*        (2006.01)
    *B25J 17/02*        (2006.01)
    *H04B 3/60*        (2006.01)

(52) U.S. Cl.
    CPC ............... *B25J 9/047* (2013.01); *B25J 13/08* (2013.01); *B25J 19/021* (2013.01); *H04B 3/60* (2013.01)

(58) Field of Classification Search
    USPC ...................................................... 74/490.05
    See application file for complete search history.

(56) References Cited

U.S. PATENT DOCUMENTS

| | | |
|---|---|---|
| 6,628,338 B1 | 9/2003 | Elberbaum et al. |
| 8,692,500 B2 | 4/2014 | Aceky et al. |
| 9,399,276 B2 | 7/2016 | Sakata |
| 10,022,861 B1 | 7/2018 | He et al. |
| 10,807,252 B2 | 10/2020 | Nakayama et al. |
| 11,009,047 B2 | 5/2021 | Markowski et al. |
| 2017/0341228 A1 | 11/2017 | Ryu et al. |

FOREIGN PATENT DOCUMENTS

| | | |
|---|---|---|
| DE | 4132775 A1 | 4/1993 |
| DE | 202014010032 U1 | 3/2016 |
| DE | 102017104319 A1 | 9/2017 |
| EP | 0722811 A1 | 7/1996 |
| EP | 2138281 B1 | 3/2011 |
| EP | 3372354 A1 | 9/2018 |
| WO | 2019038221 A1 | 2/2019 |

OTHER PUBLICATIONS

International Search Report and Written Opinion dated Oct. 4, 2021 in connection with PCT/EP2021/065422, 17 pages including English translation.

Office Action dated Nov. 16, 2020 in connection with German Patent Application No. DE 10 2020 115 448.8, 13 pages including English translation.

Office Action dated Jun. 9, 2023 in connection with Chinese patent application No. 202180040823.5, 8 pages including English translation.

English translation of DE202014010032U1 (Mar. 21, 2016), 11 pages.

ARM MODULE FOR A MODULAR ROBOT ARM OF AN INDUSTRIAL ROBOT

CROSS-REFERENCE TO RELATED APPLICATIONS

This patent application is a continuation of International Patent Application No. PCT/EP2021/065422, filed 9 Jun. 2021, ARM MODULE FOR A MODULAR ROBOT ARM OF AN INDUSTRIAL ROBOT, which claims the priority of German patent application DE 10 2020 115 448.8, filed 10 Jun. 2020, ARMMODUL FÜR EINEN MODULAREN ROBOTERARM EINES INDUSTRIEROBOTERS, the disclosure content of each of which is hereby incorporated by reference herein, in the entirety and for all purposes.

FIELD

The invention relates to an arm module for a modular robot arm of an industrial robot. Furthermore, the application relates to an industrial robot.

BACKGROUND

The technical discipline of automation technology (implementation, measurement, control/regulation, communication, man/machine interface, safety, etc.) has the object of automating machines incl. industrial robots and/or systems, i.e. to be able to operate them independently and without the involvement of a human being. A degree of automation (ratio of automated manufacturing steps to all manufacturing steps) in an automation system is higher, the more independent a respective machine in a system and/or a respective system is/are from human intervention.

The objectives of automation technology are, inter alia, relieving humans from dangerous, strenuous and/or monotonous activities, improving a quality with the technical system, a higher efficiency of the system and a cost reduction by the system. Due to advances in machines, signal acquisition, signal processing and/or communication (networking) of components within the automation system, the degree of automation of an existing or a new system may be significantly increased compared to the state of the art.

Application-specific industrial robots (manipulators) are an integral part of automated systems. An industrial robot is a programmable machine for handling, assembling and/or machining workpieces. The industrial robot generally comprises a robot base, a robot arm (manipulator) with a plurality of mutually pivoting and/or rotating (angle of rotation limited, possibly slightly larger than about 360°), proximal (toward a robot base) and distal (away from the robot base) arm links, an (end)-effector (robot hand, tool, gripper, etc.), a local control/regulation, and possibly a global control/regulation. Industrial robots are often equipped with different sensors. When programmed, the industrial robot is able to autonomously perform a workflow or to change an execution of a task depending on information from a sensor, for example.

Arm links that may be pivoted or rotated in relation to one another have a common mechanical interface, wherein optical signals and/or electrical voltage (control information) as well as electrical energy must be transported beyond the mechanical interface and, if necessary, a fluid (gas(es) and/or liquid(s)) must be guided away. For this purpose, drag chains are required to guide the corresponding lines and not to destroy them. In this context, arbitrary rotations (rotations) of mutually concerning arm links are not possible. Furthermore, different interfaces mean several manufacturers.

SUMMARY

A robot arm with a plurality of individual arm modules is provided, the arm modules of which are rotatable relative to one another, wherein control information may pass through the arm modules which are rotatable relative to one another.

EXAMPLES

An arm module is provided, the arm module comprising a housing having at least a first connection side and at least a second connection side, the first connection side being configured to be controllably rotatable relative to the second connection side about an axis of rotation, the first connection side having a rotatable first connection device and the second connection side having a second connection device fixed to the housing, and having a rotation-compatible data transmission device for transmitting data signals along a transmission path between the first connection side and the second connection side, wherein the transmission path comprises at least one wireless transmission sub-path for wireless transmission of data signals and at least one wire-guided transmission sub-path for wire-guided transmission of data signals, wherein the rotation-compatible data transmission device comprises at least one first wireless transceiver unit and at least one second wireless transceiver unit, each of which is interconnected via the transmission path and configured to wirelessly transmit and receive data signals along the at least one wireless transmission sub-path.

This has the technical advantage that an arm module for an industrial robot may be provided in which data transmission between two mutually rotatable connection sides of the arm module is made possible.

The arm module comprises a housing with at least one first connection side and at least one second connection side. Arm modules with more than one first connection side and/or more than one second connection side could also be provided. The invention is further described with reference to an arm module having a first connection side and a second connection side. However, it is not limited to this exact embodiment or number of first and second connection sides. The first connection side is embodied to be controllably rotatable relative to the second connection side about an axis of rotation. The first connection side comprises a rotatable first connection device and the second connection side comprises a second connection device fixed to the housing. Furthermore, a rotation-compatible data transmission device is provided for a rotation-compatible transmission of data signals between the first connection side and the second connection side.

The rotation-compatible data transmission device allows for transmitting data signals between the first and second connection sides, which may be rotated relative to each other. Impairment of the data transmission due to the rotation of the first connection side relative to the second connection side may be avoided.

For this purpose, the rotation-compatible data transmission device comprises at least one first wireless transceiver unit and at least one second wireless transceiver unit, which are each set up to transmit and receive data signals wirelessly for wireless transmission. At least one wireless transmission path for wireless transmission of data signals between mutually rotatable wireless transceiver units is defined via the first and second wireless transceiver units. The mutually rotatable wireless transceiver units that exchange data signals with one another may be arranged in an arm module or may be two wireless transceiver units of two arm modules of an industrial robot that are rotatably connected to each other.

Via the at least one wireless transmission path defined by two wireless transceiver units, data transmission between two wireless transceiver units rotating against each other is possible without any impairment of the data transmission.

By coupling a plurality of arm modules configured in this way, a modular robot arm for an industrial robot may be realized which may be rotated as desired, so that angles of rotation (rotational angles) significantly greater than 360° may also be realized, wherein data transmission between all arm modules of the modular robot arm is guaranteed permanently and continuously and for any angle of rotation.

Alternatively, the arm module may further comprise an electrical rotation-compatible transmission device and/or a fluidic rotation-compatible transmission device. Via the electrical rotation-compatible transmission device and/or the fluidic rotation-compatible transmission device, a rotation-compatible transmission of electrical energy and/or fluid, e.g. compressed air, is made possible between the first and second connection sides of the arm module, which may be rotated against each other. This allows for a robot arm of an industrial robot, as described above, being supplied with electrical energy and working fluid for any rotation of individual arm modules relative to one another.

The arm module may further comprise multifunctional interfaces on both the first connection side and the second connection side, which allow for transmitting data signals as well as electrical power and/or working fluid between two interconnected arm modules of a robotic arm.

The rotatable first connection device may comprise first mechanical connecting elements and the housing-fixed second connection device may have second mechanical connecting elements. The first mechanical connecting elements and the second mechanical connecting elements are embodied complementary to each other, wherein the first contact device is arranged radially inside the first mechanical connecting elements and the second contact device is arranged radially inside the second mechanical connecting elements.

A rotatable coupling of the two arm modules is achieved by coupling two arm modules, wherein the first connection side of one arm module is coupled to the second connection side of the other arm module.

The invention is described in more detail below by means of embodiment examples with reference to the attached schematic drawings, which are not to scale. Sections, elements, parts, units, components and/or schemes which have an identical or analogous embodiment and/or function are indicated by the same reference numerals in the figure description, the list of reference numerals, the patent claims and in the figures of the drawing.

In the application, a feature may be positive, i.e., present, or negative, i.e., absent, with a negative feature not being explicitly explained as a feature unless the application emphasizes that it is absent, i.e., the invention actually made and not one constructed by the prior art is to omit that feature.

The features of the description may also be interpreted as optional features; i.e. each feature may be understood as an optional, arbitrary or preferred, i.e. a non-binding, feature. Thus, it is possible to extract a feature, possibly including its periphery, from an embodiment example, in which case this feature may be applied to a generalized idea of the invention. The absence of a feature in an embodiment example shows that the feature is optional with respect to the invention.

DETAILED DESCRIPTION

Figure 1:
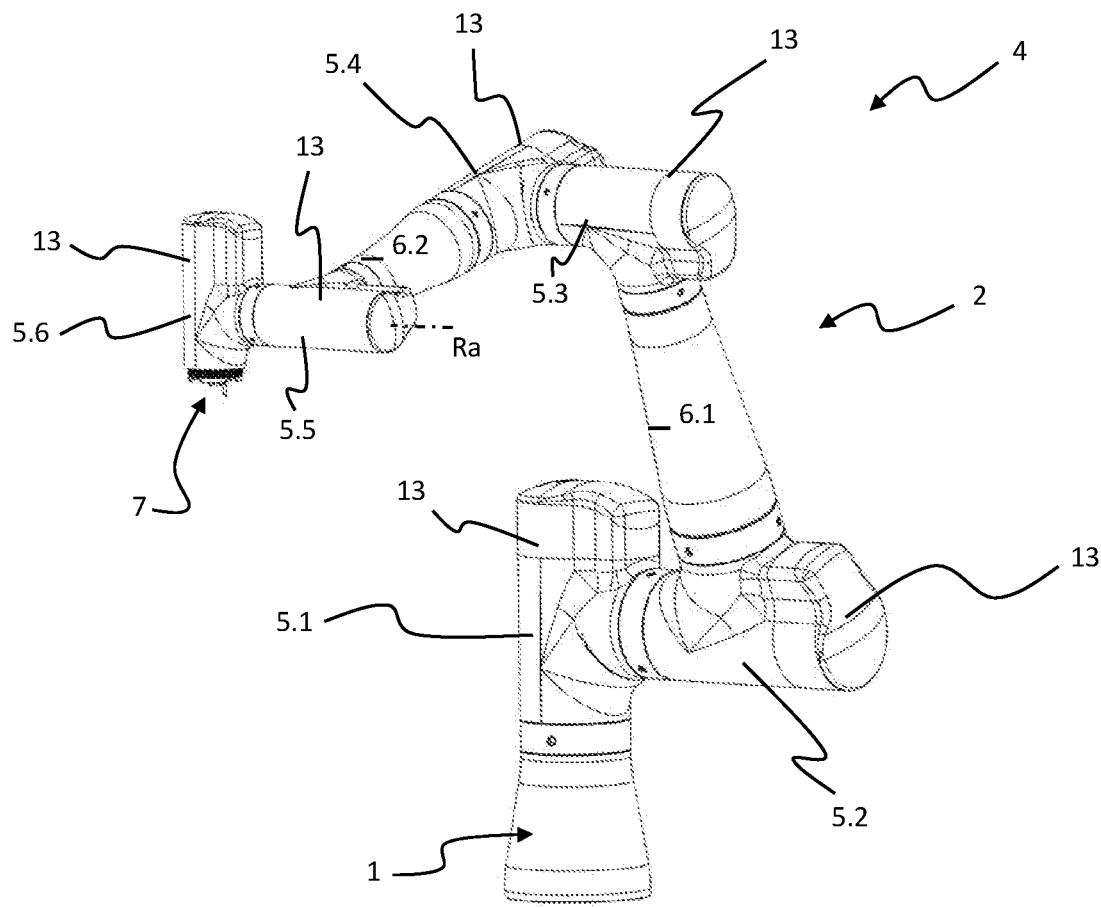
FIG. 1 is a perspective view of an industrial robot with a modular, six-axis robot arm according to an embodiment.

The invention is explained in more detail below with reference to embodiments of variants of a multifunctional rotation transfer system for embodiments of a modular robot arm for an industrial robot. Although the invention is described in more detail and illustrated by the embodiment examples, the invention is not limited by the disclosed embodiment examples, but is of a more fundamental nature.

In the figures, only those spatial sections of an object of the invention are shown which are necessary for an understanding of the invention. Furthermore, the explanation of the invention in the following refers to a polar coordinate system with an axial direction Ar, a radial direction Rr and a circumferential direction Ur. An axis of rotation Ra of a particular arm module is in this context coaxial or parallel to an axial direction Ar relating to that arm module.

For the purposes of the application, a rotation-compatible data transmission is a data transmission along a transmission path between two sections of the transmission path that are rotatable relative to each other.

For the purposes of the application, a transmission path is a path along which a transmission of data signals takes place. Such a transmission may take place wirelessly along a wireless transmission sub-path or wire-guided along a wire-guided transmission sub-path via a corresponding transmission wiring.

According to an embodiment, the arm module comprises a drive device having an output shaft connected to the rotatable first connection device of the first connection side in an un-rotatable manner, wherein the drive shaft forms a portion of the rotationally compatible data transmission device, and wherein the at least one wireless transmission sub-path or the at least one wire-guided transmission sub-path of the transmission path of the rotationally compatible data transmission device is guided through a central longitudinal passage recess of the drive shaft.

This achieves the technical advantage of providing an arm module having a space-saving rotation-compatible data transmission device. By guiding a wire-guided transmission sub-path or a wireless transmission sub-path of the transmission path of the rotation-compatible data transmission device through a central longitudinal passage recess of a drive shaft of a drive device of the arm module, it may be achieved that the respective wire-guided transmission sub-path or wireless transmission sub-path is arranged on a rotational axis of the rotatable first connection device of the first connection side of the arm module.

This allows a wireless transceiver unit connected to the rotatable first connector device via the transmission path to also be positioned on the axis of rotation of the rotatable first connector device.

When the wireless transceiver unit is rotated about the axis of rotation, the wireless transceiver unit thus remains positioned on the axis of rotation, so that data transmission between the wireless transceiver unit positioned on the axis of rotation and another wireless transceiver unit is possible with any rotation of the wireless transceiver units relative to one another.

Both wireless transceiver units may be positioned in one arm module. Alternatively, both wireless transceiver units may each be positioned in one of two rotatably coupled arm modules. In this way, a rotation-compatible transmission of data signals between the first connection side of one arm module and the second connection side of another arm module may be achieved. Moreover, a rotation-compatible transmission of data signals between two arm modules rotatably coupled to each other may be achieved.

Via the drive shaft of the drive device, which is non-rotatably connected to the rotatable first connection device of the first connection side, a rotation of the first connection side relative to the housing and relative to the second connection side of the arm module may be achieved.

According to an embodiment, the drive shaft comprises a shaft end arranged opposite the first connection device of the first connection side, wherein the first wireless transceiver unit is arranged on the shaft end of the drive shaft, wherein the second wireless transceiver unit is arranged on the housing in an un-rotatable manner, and wherein the wireless transmission sub-path is defined between the first wireless transceiver unit and the second wireless transceiver unit.

This achieves the technical advantage of providing an arm module with a rotationally compatible data transmission device that is easy to implement. By arranging the first wireless transceiver unit at the shaft end of the drive shaft and arranging the second wireless transceiver unit on the housing in an un-rotatable manner so that the wireless transmission sub-path is defined between the first and second wireless transceiver units, it is provided that the first wireless transceiver unit is rotatable with the drive shaft relative to the second wireless transceiver unit, which is arranged on the housing in an un-rotatable manner, and that data transmission is enabled via the wireless transmission sub-path between the first and second wireless transceiver units when the first and second wireless transceiver units are rotated relative to each other at will. Rotation-compatible transmission of data signals between the first connection side, which is arranged to the drive shaft in an un-rotatable manner and thus rotatable relative to the housing, and the second connection side, which is arranged on the housing in an un-rotatable manner, is thus made possible for any rotations of the first connection side relative to the second connection side.

According to an embodiment, the transmission path comprises at least one first wire-guided transmission sub-path and at least one second wire-guided transmission sub-path, wherein the first wire-guided transmission sub-path connects the first wireless transceiver unit to the first connection device of the first connection side, and wherein the second wire-guided transmission sub-path connects the second wireless transceiver unit to the second connection device of the second connection side.

This achieves the technical advantage of providing an arm module with an easy-to-implement rotation-compatible data transmission device. For this purpose, the transmission path comprises at least one first wire-guided transmission sub-path and at least one second wire-guided transmission sub-path, the first wire-guided transmission sub-path connecting the first wireless transceiver unit to the first connection device, and the second wire-guided transmission sub-path connecting the second wireless transceiver unit to the second connection device. The first and second wire-guided transmission sub-paths thus allow for wire-guided data transmission between the first and second wire-guided transceiver units and the first and second connection devices of the first and second connection sides. The first and second wire-guided transmission sub-paths ensure robust data transmission with low susceptibility to transmission errors within the arm module.

According to an embodiment, the first wire-guided transmission sub-path extends through the central longitudinal passage recess of the drive shaft.

This provides the technical advantage of allowing rotation of the first wire-guided transmission sub-path relative to the second wire-guided transmission sub-path by any angle of rotation. By allowing the first wire-guided transmission sub-path to pass through a central longitudinal passage recess of the drive shaft, twisting of the first wire-guided transmission sub-path may be prevented from occurring upon rotation of the first connection side relative to the housing of the arm module. By having both the first wireless transceiver unit and the first wire-guided transmission sub-path disposed on the drive shaft in an un-rotatable manner, rotation of the drive shaft about the axis of rotation causes simultaneous rotation of both the first wireless transceiver unit and the first wire-guided transmission sub-path disposed on the axis of rotation of the drive shaft.

According to an embodiment, the first wireless transceiver unit and the second wireless transceiver unit are arranged opposite to each other on a first axis of rotation of the drive shaft, with the wireless transmission sub-path oriented in parallel to the first axis of rotation.

This achieves the technical advantage of providing an arm module with rotation-compatible data transmission. By arranging the first and second wireless transceiver units opposite each other on the first axis of rotation of the drive shaft, it is achieved that the wireless transmission sub-path between the first and second wireless transceiver units is also oriented on the first axis of rotation. During rotation of the first wireless transceiver unit relative to the second wireless transceiver unit, it is thereby achieved that an orientation of the two first and second wireless transceiver units relative to each other is not changed by the rotation, since the first axis of rotation of the drive shaft passes through the geometric centers of the first and second wireless transceiver units and these thus remain arranged in unchanged orientation during the rotation on the first axis of rotation. This achieves that during rotation by any angle, the wireless transmission sub-path between the first and second wireless transceiver units remains positioned on the first axis of rotation. This ensures robust and transmission error stable wireless transmission of data signals between the first and second wireless transceiver units.

According to an embodiment, the first wireless transceiver unit is disposed on a first axis of rotation of the drive shaft, wherein the second wireless transceiver unit is disposed at an angle to the first axis of rotation, wherein the rotationally compatible data transmission device comprises a deflecting device disposed on the first axis of rotation for deflecting wirelessly transmittable data signals, and wherein the wireless transmission sub-path is defined between the first wireless transceiver unit, the deflecting device, and the second wireless transceiver unit.

This achieves the technical advantage of providing the most space-saving rotation-compatible data transmission device possible. By arranging the first wireless transceiver unit on the axis of rotation of the drive shaft, while the second wireless transceiver unit is arranged on the housing in an un-rotatable manner at an angle to the axis of rotation of the drive shaft, it may be achieved that a length of the wireless transmission sub-path between the first and second wireless transceiver units may be maximized with a minimum distance between the first and second wireless transceiver units. This is achieved via the deflecting device which is disposed between the first and second wireless transceiver units and wirelessly deflects data signals at an angle between the first and second wireless transceiver units. By increasing the length of the wireless transmission path, transmission errors of the wirelessly transmitted data signals may be reduced and/or eliminated. Through this, an error robust data transmission may be achieved.

According to an embodiment, the first wire-guided transmission sub-path comprises at least one first transmission line and at least one first contacting unit, wherein the second wire-guided transmission sub-path comprises at least one second transmission line and at least one second contacting unit, wherein the first contacting unit is arranged at the first connection device, and wherein the second contacting unit is arranged at the second connection device.

This achieves the technical advantage that robust and reliable data transmission is achieved between the first wire-guided transmission unit and the first connection device and/or between the second wire-guided transmission unit and the second connection device via the first and/or second wire-guided transmission sub-paths. A reliable data interface to further arm modules is enabled via the first and second contacting units arranged at the first and second connection devices, which allows for reliable data transmission between arm modules of the robot arm. Data signals may be exchanged between the arm modules via the contacting units of two interconnected arm modules as wire-guided data signals.

According to an embodiment, the first contacting unit and the second contacting unit each comprise at least two transmitting channels and/or at least two receiving channels for transmitting and/or receiving data signals, wherein the first transmission line and the second transmission line each comprise a plurality of twisted pair wires.

This achieves the technical advantage that interfaces are provided via the first and second contacting units that allows for data signals to be transmitted and/or received. Interference-free data transmission may be achieved via the plurality of twisted pair wires of the first and second transmission lines.

Alternatively, two transmitting channels may be combined into one transmitting channel via differential line pairs and two receiving channels into one receiving channel via two differential line pairs.

According to an embodiment, the drive shaft comprises a shaft end arranged opposite to the first connection device of the first connection side, wherein the first wireless transceiver unit is arranged on the housing opposite the shaft end of the drive shaft in an un-rotatable manner, wherein the second wireless transceiver unit is arranged on the housing opposite to the second connection device in an un-rotatable manner, and wherein the wire-guided transmission sub-path is defined between the first wireless transceiver unit and the second wireless transceiver unit.

This achieves the technical advantage that an arm module may be provided with a rotation-compatible data transmission that is easy to implement. For this purpose, the first and second wireless transceiver units are each arranged on the housing in an un-rotatable manner and connected to each other via a wire-guided transmission sub-path. The first wireless transceiver unit is arranged opposite to the shaft end of the drive shaft, while the second wireless transceiver unit is arranged opposite to the second connection side. The transmission path of the rotation-compatible data transmission device comprises a first wireless transmission sub-path and a second wireless transmission sub-path. The first wireless transmission sub-path is defined between the first wireless transceiver unit and the first connection device of the first connection side, and the second wireless transmission sub-path is defined between the second wireless transceiver unit and the second connection device of the second connection side. The un-rotatable arrangement of the first and second wireless transceiver units on the housing allows for a robust and easily constructed rotationally compatible data transmission device.

According to an embodiment, the transmission path comprises at least a first wireless transmission sub-path and at least a second wireless transmission sub-path, wherein the first wireless transmission sub-path is defined between the first wireless transceiver unit and a first wireless data interface device of the first connection device and passes through the central longitudinal passage recess of the drive shaft, wherein the second wireless transmission sub-path is defined between the second wireless transceiver unit and a second wireless data interface device of the second connection device, and wherein the first wireless data interface device is disposed on the first axis of rotation of the first connection side and the second wireless data interface device is disposed on a second axis of rotation of the second connection side.

This achieves the technical advantage of providing a rotationally compatible data transmission device that is easy to configure. For this purpose, the transmission path of the rotation-compatible data transmission device comprises a first wireless transmission sub-path and a second wireless transmission sub-path.

The first wireless transmission sub-path is defined between the first wireless transceiver unit and the first connection device of the first connection side. The second wireless transmission sub-path is defined between the second wireless transceiver unit and the second connection device of the second connection side.

The first wireless transmission sub-path is further arranged along the central longitudinal passage recess of the drive shaft and positioned on the first axis of rotation of the drive shaft. Thus, a data transmission from, e.g. the first wireless transceiver unit towards the first connection device of the first connection side passes through the central longitudinal recess of the drive shaft and therefore remains unaffected by a rotation of the drive shaft. In the case of rotatable coupling of two arm modules, in which a coupling is implemented between the first connection side of one arm module and the second connection side of the respective other arm module, a rotationally compatible data transmission between the first wireless transceiver unit of one arm module and the second wireless transceiver unit of the respective other arm module is thus enabled via the wireless transmission sub-path between the two wireless transceiver units, which runs through the longitudinal recess of the drive shaft of one arm module.

According to an embodiment, the wire-guided transmission path is formed by a transmission line, wherein the first wireless transceiver unit and the second wireless transceiver unit are connected to each other via the transmission line.

This provides the technical advantage of providing reliable data transmission between the first wireless transceiver unit and the second wireless transceiver unit within an arm module.

According to an embodiment, the first wireless transceiver unit and the second wireless transceiver unit are configured as a first optical transceiver unit and a second optical transceiver unit, respectively, which are configured to transmit and/or receive light signals as data signals.

This achieves the technical advantage that an arm module with a robust rotation-compatible data transmission device may be provided, which allow for a reliable and low error-sensitive wireless transmission of data signals. By embodying the first and second wireless transceiver units as first and second optical transceiver units, which are set up to transmit and/or receive light signals as data signals, a reliable and low error-sensitive wireless transmission of data signals may be achieved, which allows for a transmission of high bit rates and high transmission rates over small path distances.

In addition, the transmission of light signals may be used to ensure that further control units of the arm module or the robot arm of the industrial robot remain unaffected by the wireless transmission of the data signals. Thus, a wireless data transmission may be provided that allows for high bit rates and high transmission rates, is not very error-prone and exerts little influence on further electronics or sensors of the arm module.

According to an embodiment, the wireless transmission sub-path is formed by a light guide.

Hereby, the technical advantage is achieved that a high transmission reliability and a low error susceptibility of the wireless transmission of data signals by the rotation-compatible transmission device may be achieved. By forming the wireless transmission sub-paths through corresponding light guides arranged between the first and second optical transceiver units, low bit errors due to erroneous optical signals may be obtained. High transmission rates and low error rates of the light signals may be achieved via the light guides.

According to an embodiment, the first wireless transceiver unit and the second wireless transceiver unit are configured as a first antenna unit and a second antenna unit, which are configured to transmit and/or receive radio signals as data signals.

Hereby, the technical advantage is achieved that an arm module with a rotation-compatible data transmission device that is easy to realize may be provided. By embodying the first and second wireless transceiver units with first and second antenna units which are arranged to transmit and/or receive radio signals as data signals, a technically easy-to-implement rotation-compatible data transmission device is provided. Rotation-compatible transmission of data signals may be achieved by transmitting and receiving of radio signals between the first and second antenna units.

An industrial robot having a modular robot arm comprising a plurality of arm modules according to the application is provided.

This achieves the technical advantage that an industrial robot may be provided with arm modules that allow for rotation-compatible data transmission within the arm modules and between rotatably coupled arm modules.

For two connection sides of an arm module oriented at right angles to each other, this results in a first axial direction $Ar_{11}$, first radial directions $Rr_{11}$ and a first circumferential direction $Ur_{11}$, and a second axial direction $Ar_{12}$, second radial directions $Rr_{12}$ and a second circumferential direction $Ur_{12}$.

A rotation-compatible transmission of data signals is to take place, wherein a rotation-compatible transmission of data signals relates to a transmission of data signals between two connection sides of an arm module that rotate relative to one another. This also achieves a rotation-compatible transmission of data signals between rotatably coupled arm modules of the industrial robot.

Furthermore, a corresponding rotation-compatible transmission of electrical current or electrical voltage and/or fluid between two mutually rotatable arm modules may take place in the industrial robot with the aid of a multifunctional rotation-compatible transmission system. The arm modules of the modular industrial robot may in this context be connected to one another via pluggable or screwable contacts. Corresponding connection devices for transmitting data signals, electrical current or electrical voltage and/or fluid may also be pluggable.

Wireless and wired signal transmission paths are used for the transmission of data signals. For this purpose, a rotation-compatible data transmission device of the multifunctional rotation-compatible transmission system is necessary in order to be able to implement the requirement of rotatability of the arm modules relative to one another, wherein the rotation-compatible data transmission device may be embodied inside the arm module or between two arm modules.

Furthermore, in order to be able to implement the requirement of a rotatability of the arm modules relative to one another, a rotation-compatible transmission of electric current or electric voltage may take place inside the arm module by an electric rotation-compatible transmission device of the multifunctional rotation transfer system, preferably in the form of an electric slip ring device.

Furthermore, in order to be able to realize a rotationally compatible transmission of fluid, a rotationally compatible transmission of fluid may take place inside the arm module by a fluidic rotationally compatible transmission device of the multifunctional rotationally compatible transmission system, preferably in the form of a fluidic rotational feedthrough.

The rotationally compatible transmission of current or voltage and/or fluid is not described in further detail below.

FIG. 1 shows an exemplary embodiment of a variant of a robot arm 2 of a modular industrial robot, which may also be referred to as a handling robot or working machine. An industrial robot is an automatic machine with several degrees of freedom, which may perform various functions in a working environment in (conditional) autonomous performance by a pre-programmed control/regulation. The modular industrial robot comprises a robot base 1, the robot arm 2 and a preferably exchangeable (end-) effector, also referred to as robot hand, with for example a tool, a gripper etc., which may be arranged at a distal end 7 of the robot arm 2.

The robot arm 2 has two to six axes of motion. In the embodiment shown in FIG. 1, six rotational degrees of freedom are provided. Any number of complete and partial rotations of a respective arm module 4 of the robot arm 2 in both circumferential directions of a respective rotational axis may be performed. It is possible to embody a respective rotational axis as a pivot axis or rotational axis, i.e. to limit a movement of the respective arm module 4 to a certain angle, such as angles smaller than 720°, 540°, 360°, 270°, 180°, 90° or 45°.

Sensors may be assigned to an arm module 4 or to a respective rotational axis Ra of the arm module 4, the data from which may be used to control the corresponding arm module 4 or the robot arm 2. For example, a force and/or torque sensor as well as a position sensor may be provided, with the aid of which a force and/or torque on the arm module 4 as well as a position of the arm module 4 may be detected. This may also be limited to a section or a longitudinal end section of the robot arm 2.

The present robot arm 2 of the industrial robot has a modular design with a plurality of arm modules 4. In principle, the arm modules 4 may be embodied as desired, wherein, as shown in FIG. 1, a distinction may be made between active arm modules 5 and passive arm modules 6. An active arm module 5 has a drive device 13 with the aid of which a further arm module 4 connectable thereto may be pivoted, rotated and/or rotated. Similarly, a passive arm module 6 has no drive device. All features of the arm module 4 which are described essentially for an active arm module 5 may also be embodied analogously or in adapted form in a passive arm module 6. Alternatively, a passive arm module 6 may also have none or only some of the described rotation transfer devices for data, energy and/or fluid.

In the present case, a certain modular system for a robot arm 2 comprises at least one type of active arm module 5 in J-shape and, as the case may be, at least one type of passive arm module 6 in I-shape, in each case with connections on the front face and/or longitudinal/trunk side and in each case mechanically complementary or mechanically analogous to one another. Instead of a J-shape for the active arm module 5 or an I-shape for the passive arm module 6, other geometric shapes may be applicable. Alternatively, the active arm module 5 may have an I-shape and the passive arm module 6 may have a J-shape.

Apart from the robot base 1 and/or an effector at the distal end 7, all arm modules 4 of such a modular system for robot arms 2 are preferably embodied in such a way that two connections of two arm modules 4 always correspond to each other and may be connected to each other. This means that a first connection side of any arm module 4 of the modular system may be connected to a second connection side of any other arm module 4 of this modular system, or vice versa. Preferably, the first connection side and the second connection side of the arm module 4 each have a uniform, complementary contacting mimic, which ensures compatibility of the arm modules 4 across relevant, in particular all, series of the modular system.

In FIG. 1, the active arm modules 5 and the passive arm modules 6 are each provided with an additional number for differentiation, separated by a dot, and numbered starting from the robot base 1 in the direction of the distal end 7. In the robot arm 2 in the embodiment according to FIG. 1, a first active arm module 5.1 is connected to the robot base 1 at the first connection side. The first connection side of a second active arm module 5.2 is connected to the second connection side of the first active arm module 5.1. A first passive arm module 6.1 is arranged between the second active arm module 5.2 and a third active arm module 5.3, which connects the second connection side of the second active arm module 5.2 to the second connection side of the third active arm module 5.3. The second connection side of a fourth active arm module 5.4 is connected to the first connection side of the third active arm module 5.3. The first connection side of the fourth active arm module 5.4 is connected to the second connection side of a fifth active arm module 5.5 via a second passive arm module 6.2. The second connection side of a sixth active arm module 5.6 is connected to the first connection side of the fifth active arm module 5.5, the first connection side of which then forms the distal end 7 of the robot arm 2.

Figure 2:
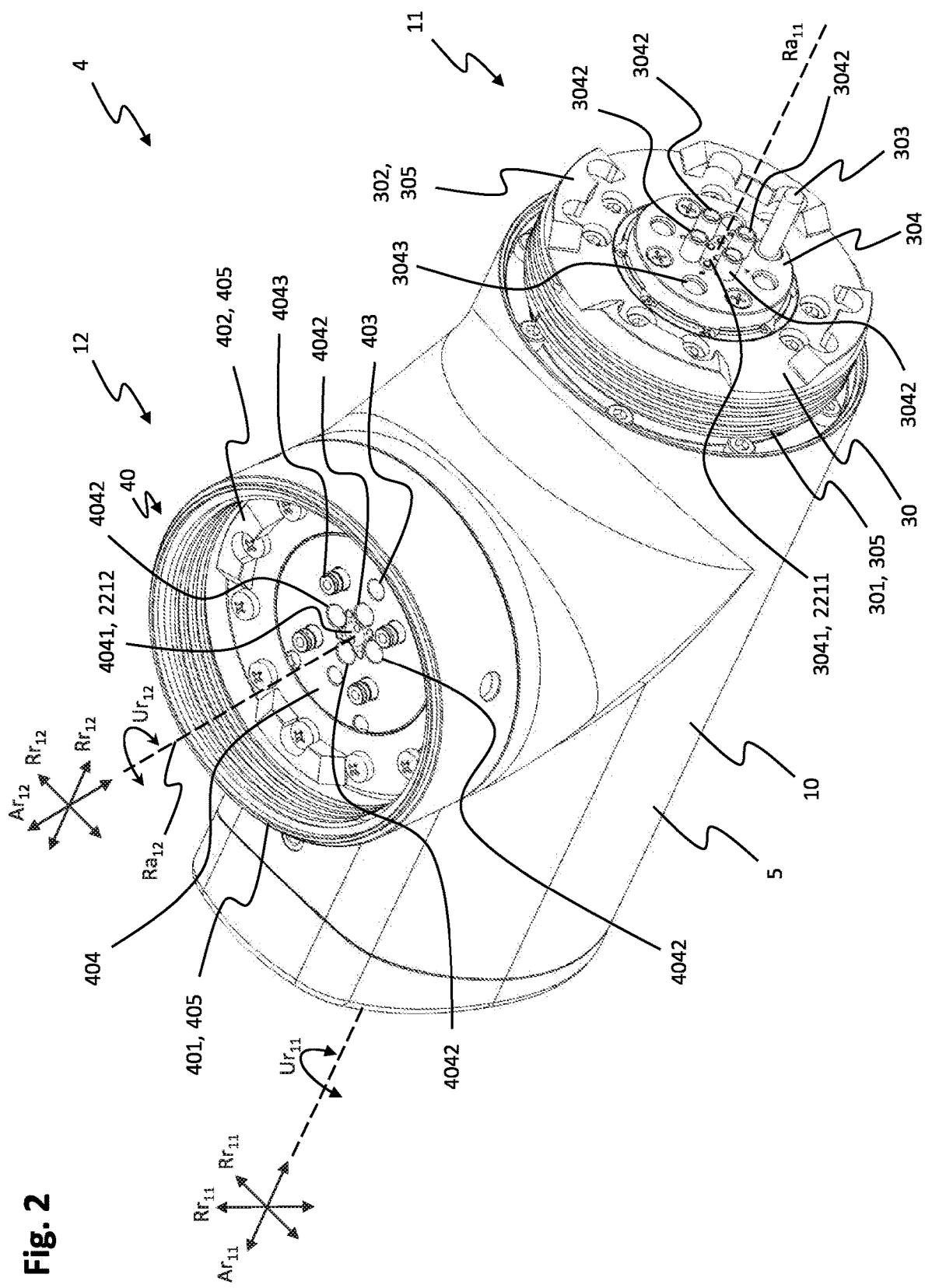
FIG. 2 is a perspective view of an active arm module for a robot arm of FIG. 1 according to an embodiment.

FIG. 2 shows a perspective view of an example of an active arm module 5 for the robot arm 2 from FIG. 1. Here, a J-shaped housing 10 mechanically connects the first connection side 11 to the second connection side 12. For the first connection side 11 and the second connection side 12, a respective polar coordinate system with an axial direction Ar, a radial direction Rr and a circumferential direction Ur is shown, each of which is provided with a corresponding index for the associated connection side. Furthermore, an associated rotational axis Ra with the corresponding index is shown for each connection side.

The first connection side 11 of the active arm module 5 may mechanically, data-wise, electrically and/or fluidically be coupled to the second connection side of a further arm module 4. Furthermore, the second connection side 12 of the active arm module 5 may mechanically, data-wise, electrically and/or fluidically be coupled to the first connection side of a further arm module 4. Here, the first connection side 11 of the active arm module 5 is preferably rotatably provided on the active arm module 5, with the second connection side 12 then being fixedly set up on the active arm module 5. However, the determination of rotatable and non-rotatable connection side may also be exactly the opposite. In a passive arm module 6 in FIG. 1, both the first connection side and the second connection side are rigidly embodied at an I-shaped housing. The first connection side 11 and the second connection side 12 of the active arm modules 5 and/or the passive arm modules 6 are embodied to correspond to each other.

In the arm module 4 shown in FIG. 2, the first connection side 11 has a first rotatable connection device 30 and the second connection side 12 has a second connection device 40 fixed to the housing.

The rotatable first connection device 30 which extends perpendicularly to the first axis of rotation $Ra_{11}$ of the first connection side 11 is circular in shape and is rotatably arranged on the housing 10. An external thread 301 is provided on an outer peripheral side of the first connection device 30. The first connecting device 30 has a first face gearing 302 having four teeth, which is embodied as a Hirth joint. The external thread 301 and the first face gearing 302 form first mechanical connecting elements 305 of the rotatable first connection device 30.

The first connection device 30 further comprises a first contact device 304 that includes a first data interface device 3041, a first electrical interface device 3042, and a first fluidic interface device 3043.

The second connection device 40, which is fixed to the housing and is also circular in shape, is aligned perpendicular with regard to the second axis of rotation $Ra_{12}$ of the second connection side 12 and is connected to the housing 10 in an un-rotatable manner. On the circumferential side, the second connection side 12 has a fastening ring 401 with an internal thread, the internal thread being embodied to correspond to the external thread 301 of the first connection device 30. The second connection device 40 further comprises a second face gearing 402 having four teeth, which is embodied as Hirth joint and is embodied complementary with regard to the teeth of the first face gearing 302 of the first connection device 30. A centering receptacle 403 corresponding to a centering pin 303 of the first connecting device 30 is also provided in the second connecting device 40. The fastening ring 401 with the internal thread and the second face gearing 402 form second mechanical connecting elements 405 of the second connection device 40 fixed to the housing.

The second connection device 40 further comprises a second contact device 404 including a second data interface device 4041, a second electrical interface device 4042, and a second fluidic interface device 4043 that are complementary to the first data interface device 3041, the first electrical interface device 3042, and the first fluidic interface device 3043 of the first contact device 304 of the first connection device 30.

When assembling the robot arm 2 as shown in FIG. 1, the first connection device 30 of an active arm module 5 is placed on the second connection device 40 of another active arm module 5. In the process, the centering pin 303 engages the centering receptacle 403. The centering pin 303 and the centering receptacle 403 thus serve as an encoding device. However, a coding device of a different design could also be provided. For example, coding could be provided via a complementary geometry of the connection devices.

By twisting the fastening ring 401, the internal thread is screwed onto the external thread 301, pressing the second connection device 40 onto the first connection device 30. In the pressed-on state, the first face gearing 302 and the second face gearing 402 engage with each other in such a way that the first connection device 30 and the second connection device 40 are mechanically connected to each other in a torque-locking manner. Furthermore, the first contact device 304 contacts the second contact device 404 so that a data, electrical, and fluid coupling is provided for transmitting data signals, electrical current or voltage, and fluid.

The first contact device 304 of the first connection device 30 with the respective interface devices and the second contact device 404 of the second connection device 40 with the respective interface devices are arranged radially within the mechanical connection formed by the external thread 301 and the first face gearing 302 of the first connection device 30 and the fastening ring 401 with the internal thread and the second face gearing 402 of the second connection device 40.

The data coupling of the active arm modules 5 is performed by transmission between the first data interface device 3041 of the first contact device 304 and the second data interface device 4041 of the second contact device 404, which may be plugged into each other.

In the embodiment of FIG. 2, the first data interface device 3041 and the second data interface device 4041 are embodied as a first contacting unit 2211 and a second contacting unit 2212, which may be coupled to corresponding contacting units of further arm modules 4 and allow for wire-guided data transmission between the arm modules 4. The first contacting unit 2211 is embodied on the first axis of rotation $Ra_{11}$ and the second contacting unit 2212 is embodied on the second axis of rotation $Ra_{12}$, so that data transmission between coupled arm modules 4 takes place along the first axis of rotation $Ra_{11}$ and along the second axis of rotation $Ra_{12}$.

The electrical coupling of the active arm modules 5 is performed by transmission between the first electrical interface device 3042 of the first contact device 304 and the second electrical interface device 4042 of the second contact device 404. Preferably, the electrical interface devices are embodied as simply constructed electromechanical contact connection devices or plug connection devices.

The fluidic coupling of the active arm modules 5 is carried out by transmission between the first fluidic interface device 3043 of the first contact device 304 and the second fluidic interface device 4043 of the second contact device 404. Preferably, the fluidic interface devices are thereby embodied as simply constructed fluid-mechanical contact connection devices or plug-in connection devices.

The assembly was described as an example for two active arm modules 5 of the robot arm 2 in FIG. 1. Passive arm modules 6 are mounted in the same way. By connecting the first connection device 30 to the second connection device 40, adjacent arm modules 4 are mechanically attached. Furthermore, a data, electrical and fluid coupling for the transmission of data signals, electrical current or electrical voltage and fluid is provided.

Figure 3:
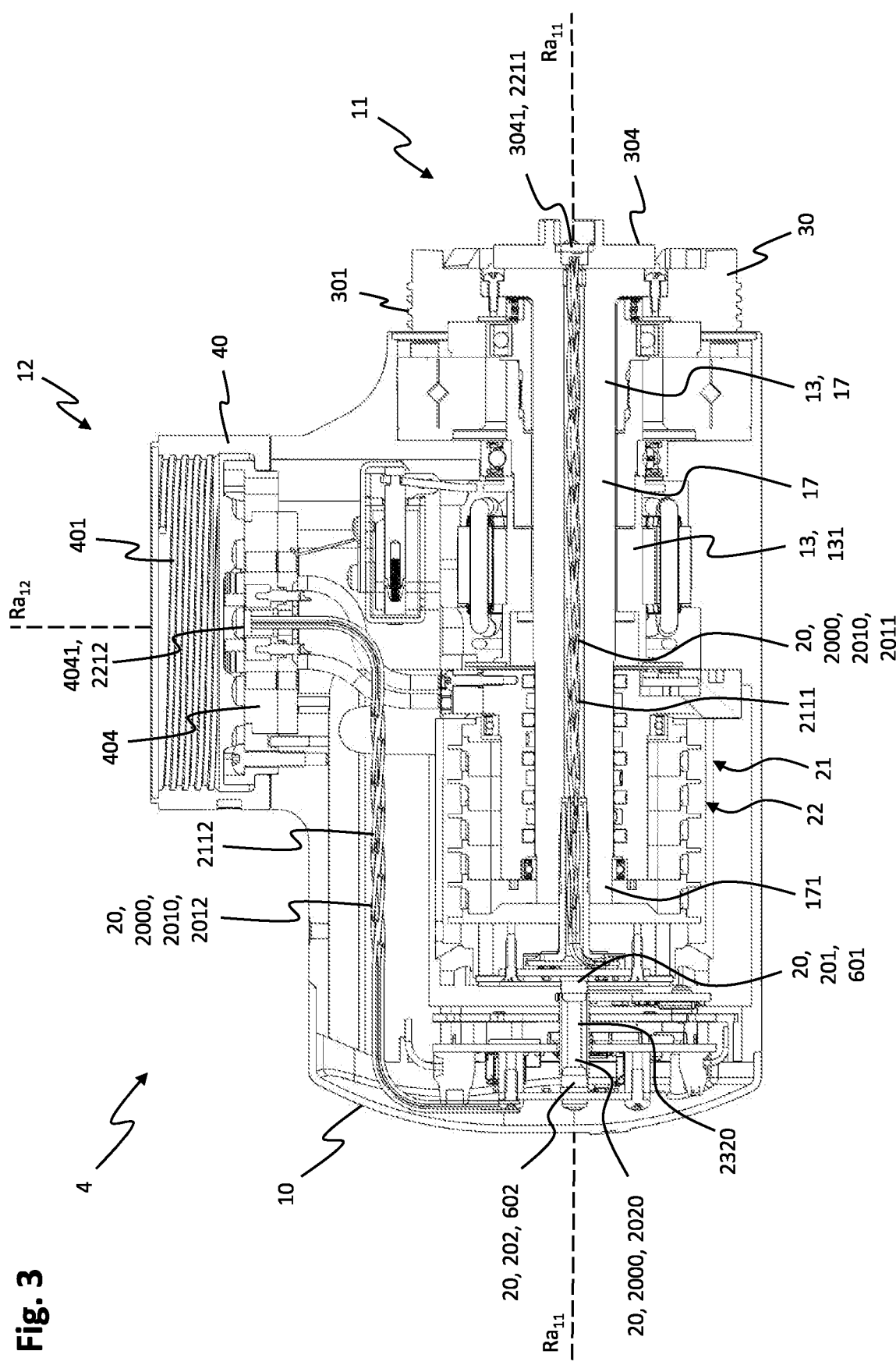
FIG. 3 is a lateral sectional view of the arm module of FIG. 2 according to an embodiment.

FIG. 3 shows a lateral sectional view of the arm module 4 of FIG. 2 according to an embodiment.

The arm module 4 comprises a drive device 13 having a drive shaft 17 and a motor unit 131. The drive shaft 17 is connected to the first contact device 304 of the first connection device 30 of the first connection side 11 in an un-rotatable manner. The drive shaft 17 is arranged in parallel to a first axis of rotation $Ra_{11}$. Via the motor unit 131, the drive shaft 17 may be rotated about the first axis of rotation $Ra_{11}$. By this, a rotation of the first contact device 304 of the first connection device 30 relative to the housing 10 of the arm module 4 may be achieved. Via a coupling of two arm modules 4 via the first connection device 30 and the second connection device 40, as described above, a rotation of the two coupled arm modules 4 relative to each other may be achieved by rotation of the drive shaft 17.

Furthermore, the arm module 4 comprises a rotationally compatible data transmission device 20. The rotationally compatible data transmission device 20 comprises a first wireless transceiver unit 201 and a second wireless transceiver unit 202. The rotationally compatible data transmission device 20 further comprises a transmission path 2000 extending between the first connection device 30 and the second connection device 40. In the embodiment shown in FIG. 3, the transmission path 2000 comprises a first wire-guided transmission sub-path 2011 and a second wire-guided transmission sub-path 2012. Furthermore, the transmission path 2000 comprises a wireless transmission sub-path 2020.

In the embodiment shown in FIG. 3, the first wireless transceiver unit 201 is arranged at a shaft end 171 of the drive shaft 17. The second wireless transceiver unit 202 is arranged opposite to the first wireless transceiver unit 201 in an un-rotatable manner at the housing 10. The first wireless transceiver unit 201 as well as the second wireless transceiver unit 202 are arranged on the first axis of rotation $Ra_{11}$ of the drive shaft 17. Via a rotation of the drive shaft 17 about the first axis of rotation $Ra_{11}$, the first wireless transceiver unit 201 is rotatable relative to the second wireless transceiver unit 202.

The first wireless transceiver unit 201 and the second wireless transceiver unit 202 face each other and define the wireless transmission sub-path 2020 between the first wireless transceiver unit 201 and the second wireless transceiver unit 202 such that the wireless transmission sub-path 2020 is arranged on the first rotational axis $Ra_{11}$.

The first wireless transceiver unit 201 and the second wireless transceiver unit 202 are configured to transmit and/or receive data signals wirelessly.

Thus, data signals may be wirelessly exchanged between the first wireless transceiver unit 201 and the second wireless transceiver unit 202 via the wireless transmission sub-path 2020. This data exchange may also be performed when, due to a rotation of the drive shaft 17, the first wireless transceiver unit 201 performs a rotation about the first rotational axis $Ra_{11}$ relative to the second wireless transceiver unit 202. Since both the first wireless transceiver unit 201 and the second wireless transceiver unit 202 are arranged on the first rotational axis $Ra_{11}$, an alignment of the first wireless transceiver unit 201 with respect to the second wireless transceiver unit 202 is maintained during a rotation about the first rotational axis $Ra_{11}$. The wireless transmission sub-path 2020 also remains positioned on the first axis of rotation $Ra_{11}$ upon rotation of the first wireless transceiver unit 201 relative to the second wireless transceiver unit 202.

The first wireless transceiver unit 201 is connected to the first data interface device 3041 of the first contact device 304 of the first connection device 30 via the first wire routed transmission sub-path 2011. In the embodiment shown in FIG. 3, the first data interface device 3041 is embodied as a first contacting unit 2211. The first wire-guided transmission sub-path 2011 is embodied as a first transmission line 2111. The first transmission line 2111 is arranged along the first axis of rotation $Ra_{11}$ within the drive shaft 17, in particular in a longitudinal passage recess 173 of the drive shaft 17.

The second wireless transceiver unit 202 is connected to the second data interface device 4041 of the second contact device 404 of the second connection device 40 via the second wire routed transmission sub-path 2012. In the embodiment of FIG. 3, the second data interface device 4041 is embodied as a second contacting unit 2212. The second wire-guided transmission sub-path 2012 is embodied as a second transmission line 2112.

With the aid of the first contacting unit 2211 and the second contacting unit 2212, when a plurality of arm modules 4 are coupled, data transmission is enabled between the coupled arm modules 4. Rotation of the drive shaft 17 to relatively rotate two coupled arm modules 4 results in simultaneous rotation of the first wireless transceiver unit 201, the first transmission line 2111, and the first contacting unit 2211. Thus, twisting of the first transmission line 2111 does not occur.

The second contacting unit 2212 is arranged on the housing 10 in an un-rotatable manner via the second contacting device 404 of the second connecting device 40. Twisting of the second transmission line 2112 during rotation of the arm modules 4 is thus also avoided. Hereby, a rotation-compatible data transmission between the first connection side 11 and the second connection side 12 of the arm module 4 may be achieved for any rotation of the drive shaft 17.

The arm module 4 further comprises an electrical rotationally compatible transmission device 21 and a fluidic rotationally compatible transmission device 22, each of which provides rotationally compatible transmission of electrical power and working fluid between the first connection side 11 and the second connection side 12.

In the embodiment shown in FIG. 3, the first wireless transceiver unit 201 is embodied as a first optical transceiver unit 601. Similarly, the second wireless transceiver unit 202 is embodied as a second optical transceiver unit 602. The first optical transceiver unit 601 and the second optical transceiver unit 602 are arranged to wirelessly transmit and/or receive light signals as data signals. Wireless data transmission between the first optical transceiver unit 601 and the second optical transceiver unit 602 thus takes place along the wireless transmission sub-path 2020 via the transmission and/or reception of light signals. For this purpose, the first optical transceiver unit 601 and the second optical transceiver unit 602 are set up to convert electrical data signals into corresponding light signals and to transmit these or to convert received light signals into corresponding electrical data signals.

In the embodiment shown in FIG. 3, a light guide 2320 is formed along the wireless transmission sub-path 2020 between the first optical transceiver unit 601 and the second optical transceiver unit 602. The light guide 2320 may be used to exchange the transmitted light signals along the wireless transmission sub-path 2020 between the first optical transceiver unit 601 and the second optical transceiver unit 602. The light guide 2320 may be embodied as a corresponding light guide cable. Alternatively, the light guide 2320 may be embodied as a transparent solid body, such as a glass body or transparent plastic body. Alternatively, instead of a light guide 2320, a hollow body such as a tube or the like may form the wireless transmission sub-path 2020 so that the data signals embodied as light signals are transmitted through the air contained in the tube. For example, the tube may have a reflective inner coating.

Figure 4:
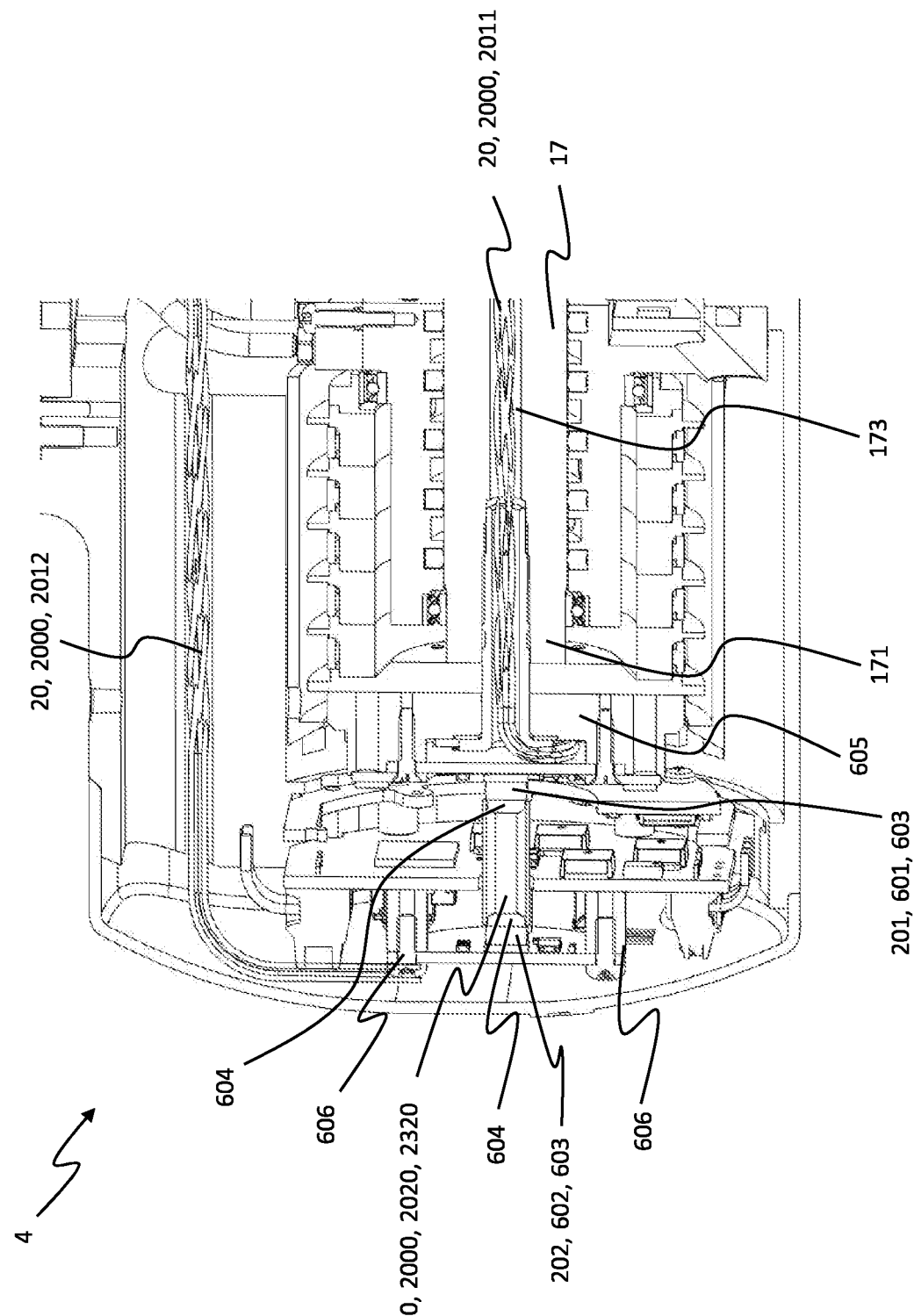
FIG. 4 is a section of the lateral sectional view of the arm module of FIG. 3.

FIG. 4 shows a section of the lateral sectional view of the arm module 4 in FIG. 3.

FIG. 4 shows the end of the arm module 4 opposite to the first connection side 11 in FIG. 3.

The first wireless transceiver unit 201, which is embodied as a first optical transceiver unit 601, is arranged in an un-rotatable manner on the shaft end 171 of the drive shaft 17 via a first suspension 605. The second wireless transceiver unit 202, which is embodied as a second optical transceiver unit 602, is arranged at the housing 10 in an un-rotatable manner via a second suspension 606.

The first optical transceiver unit 601 and the second optical transceiver unit 602 each have an optical transceiver chip 603 and a lens unit 604. The optical transceiver chip 603 is configured to convert electrical data signals into corresponding light signals and transmit them, or to receive light signals and convert them into corresponding electrical signals. The optical transceiver chip 603 is arranged for full duplex data transmission. Via the lens unit 604, focusing of the light signals to be transmitted may be achieved and transmission of the light signals may be maximized.

Via the two optical transceiver chips 603 of the first wireless transceiver unit 201 and the second wireless transceiver unit 202, light signals may be transmitted and received in a full-duplex transmission. For this purpose, the optical transceiver chips 603 each comprise at least one transmitting unit and at least one receiving unit for transmitting and receiving corresponding light signals.

The light signals transmitted and received for data transmission may have a wavelength of 850 nm, for example. A data transmission may e.g. achieve a transmission rate of 5 Gbit/s. The above numerical values serve only as exemplary embodiments of the present invention, which is not intended to be limited by them.

Figure 5:
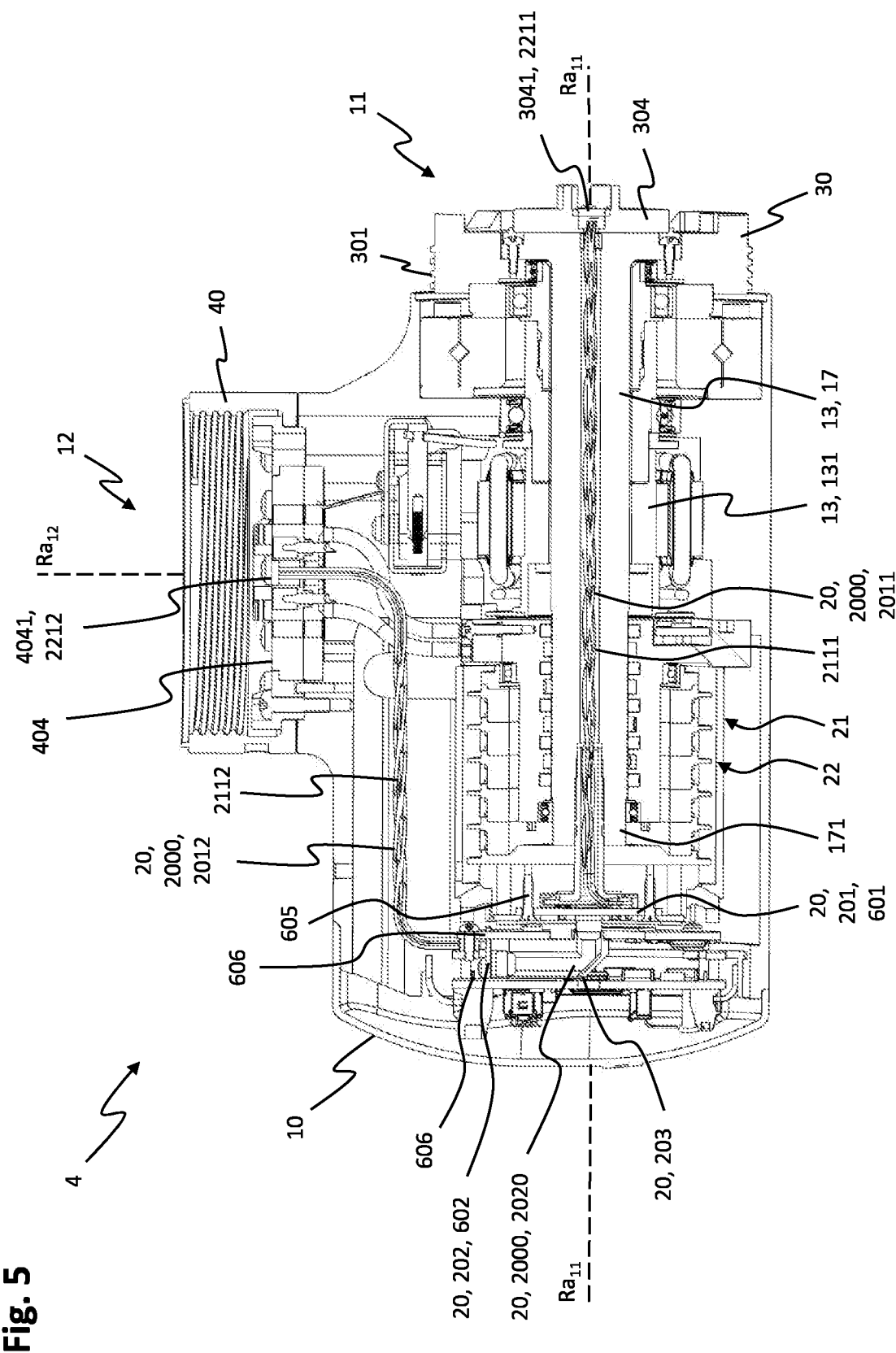
FIG. 5 is a lateral sectional view of the arm module of FIG. 2 according to a further embodiment.

FIG. 5 shows a lateral sectional view of the arm module 4 of FIG. 2 according to a further embodiment.

The embodiment in FIG. 5 is based on the embodiment in FIG. 3. The embodiment in FIG. 5 differs from the embodiment in FIG. 3 in that the second wireless transceiver unit 202 is not arranged on the first axis of rotation $Ra_{11}$, but is arranged offset from it and at an angle to the first axis of rotation $Ra_{11}$. In the embodiment shown in FIG. 5, the second wireless transceiver unit 202 is arranged at a right angle to the first rotational axis $Ra_{11}$ and thus to the first wireless transceiver unit 201. However, the second wireless transceiver unit 202 may also be arranged at a more obtuse or acute angle to the first wireless transceiver unit 201.

Furthermore, the rotation-compatible data transmission device 20 comprises a deflection device 203 arranged opposite to the first wireless transceiver unit 201 on the first rotational axis $Ra_{11}$. The deflecting device 203 is configured to wirelessly deflect the data signals between the first wireless transceiver unit 201 and the second wireless transceiver unit 202. Via the deflecting device 203, the wireless transmission sub-path 2020 is divided into two sections arranged at right angles, one of which is positioned on the first rotational axis $Ra_{11}$ and the other of which is oriented at right angles thereto, so that a data transmission between the first wireless transceiver unit 201 and the second wireless transceiver unit 202 is performed via a deflection by the deflecting device 203.

When the first wireless transceiver unit 201 is configured as the first optical transceiver unit 601 and the second wireless transceiver unit 202 is configured as the second optical transceiver unit 602, the deflection device 203 may e.g. be configured as a mirror unit that is arranged to reflect and transmit corresponding light signals between the first optical transceiver unit 601 and the second optical transceiver unit 602.

In the embodiment shown in FIG. 5, as in the embodiments shown in FIGS. 3 and 4, the first transmission line 2111 and the second transmission line 2112 are embodied as a plurality of twisted transmission wires Via the angled arrangement of the second wireless transceiver unit 202 with respect to the first wireless transceiver unit 201 and with respect to the first rotational axis $Ra_{11}$, the length of the wireless transmission sub-path 2020 may be increased at a small spatial distance of the first wireless transceiver unit 201 and the second wireless transceiver unit 202 from each other via the arrangement of the deflection device 203. This may reduce a susceptibility to errors in data transmission between the first wireless transceiver unit 201 and the second wireless transceiver unit 202. Furthermore, the angled arrangement of the two wireless transceiver units may reduce an overall size of the rotation-compatible data transmission device 20 by allowing the first wireless transceiver unit 201 and the second wireless transceiver unit 202 to be arranged in a reduced installation space.

Figure 6:
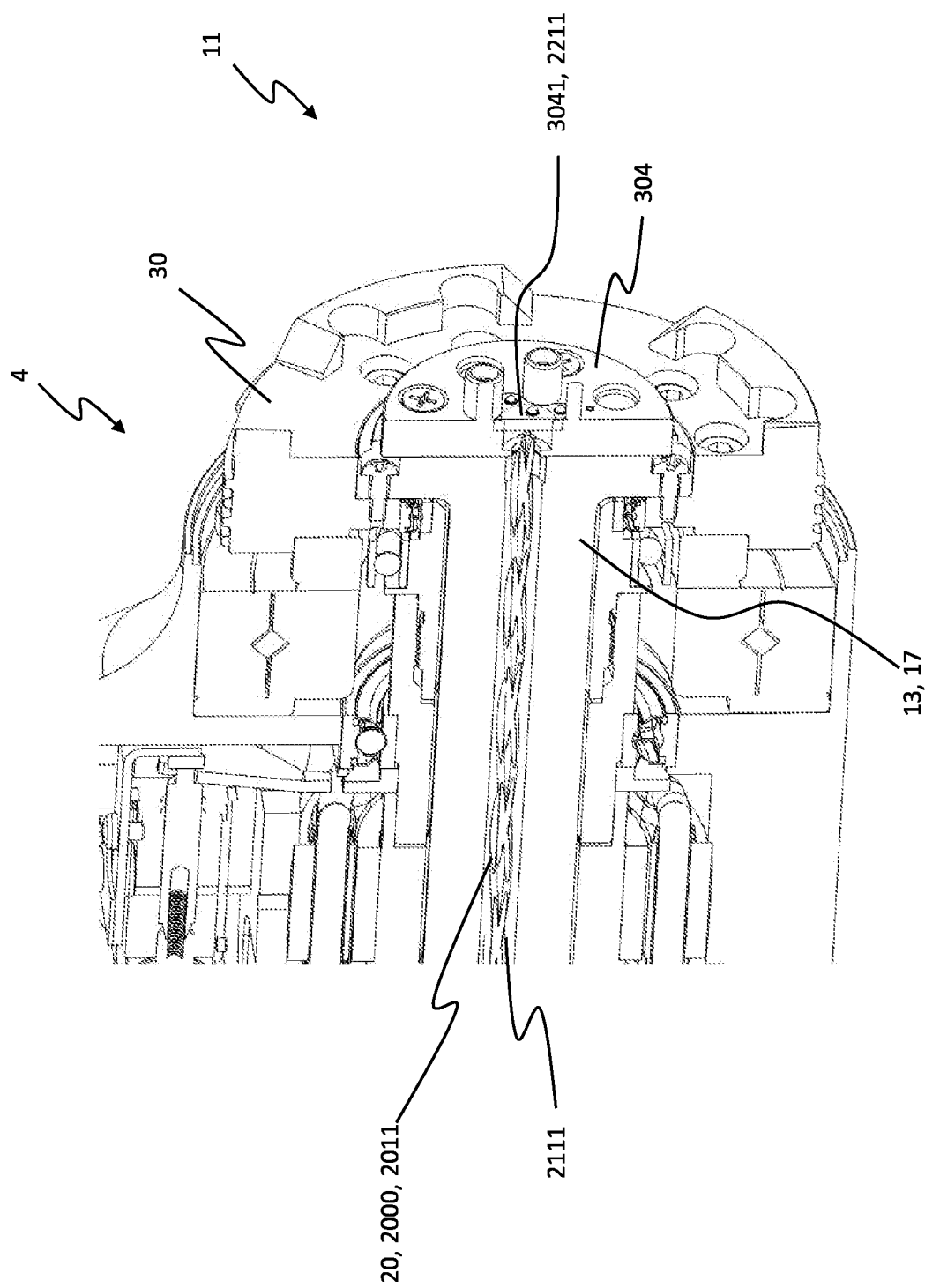
FIG. 6 is a lateral sectional view of a first connection side of the arm module of FIG. 3 and FIG. 5.

FIG. 6 shows a lateral sectional view of a first connection side 11 of the arm module 4 in FIG. 3 and FIG. 5.

In the embodiment shown in FIG. 6, the first data interface device 3041 is embodied as a first contacting unit 2211. The first contacting unit 2211 is centrally recessed in the first contact device 304 of the first connection device 30 and is connected to the twisted wires of the first transmission line 2111. The first contacting unit 2211 is centrally arranged on the first contact device 304 on the first rotational axis $Ra_{11}$, which is shown in FIG. 6.

Analogous to the arrangement of the first contacting unit 2211 shown in FIG. 6, the second data interface device 4041 in the embodiment is arranged as a second contacting unit 2212 on the second contact device 404 of the second connection device 40.

Figure 7:
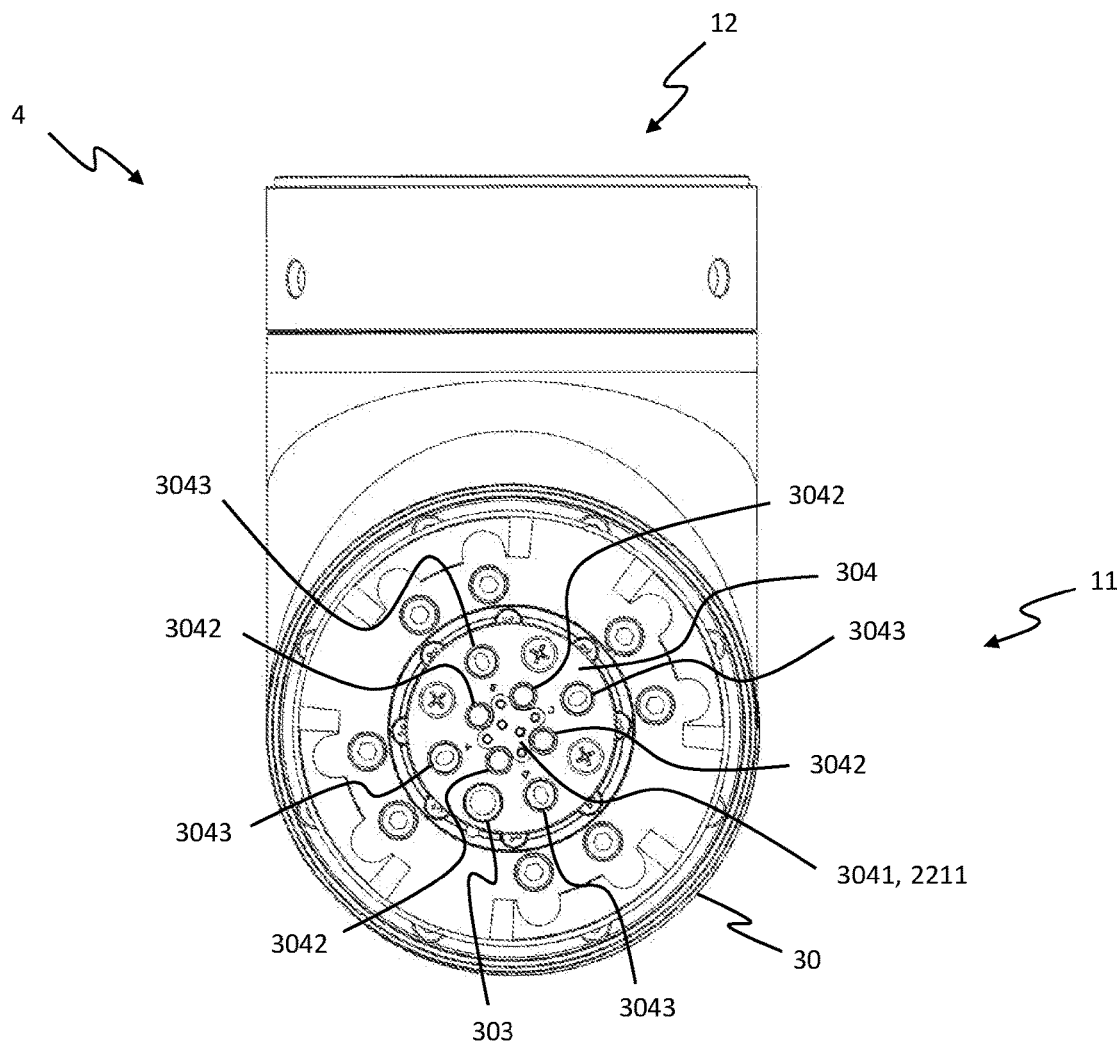
FIG. 7 is a front view of the first connection side of the arm module of FIG. 3 and FIG. 5.

FIG. 7 shows a frontal view of the first connection side 12 of the arm module 4 in FIG. 3 and FIG. 5.

In the embodiment shown in FIG. 7, the first contacting unit 2211 is centrally arranged on the first contacting device 304. The first contacting unit 2211 has a rounded X-shape and is surrounded by the four first electrical interface devices 3042.

Analogous to the arrangement of the first contacting unit 2211 shown in FIG. 7, the second contacting unit 2212 is arranged on the second contact device 404 of the second connection device 40.

Figure 8:
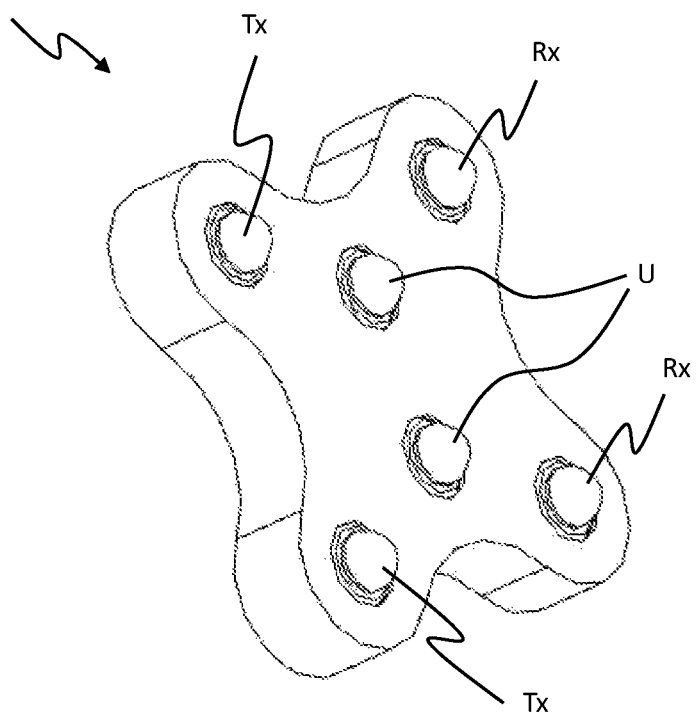
FIG. 8 is a perspective view of a contacting unit according to an embodiment.

FIG. 8 shows a perspective view of a contacting unit 2210 according to an embodiment.

In the embodiment shown in FIG. 8, the contacting unit 2210 shown has a rounded X shape. Furthermore, the contacting unit 2210 has two transmitting channels Tx and two receiving channels Rx and two voltage channels U. Via a wiring with six twisted wires of the first transmission line 2111 or of the second transmission line 2112, a data interface device is thus made possible, via which simultaneous transmission and reception of corresponding data signals is possible in full duplex mode.

In contrast to the embodiment shown in FIG. 8, the contacting unit 2210 may have a different shape or comprise a different number of transmitting and receiving channels.

Figure 9:
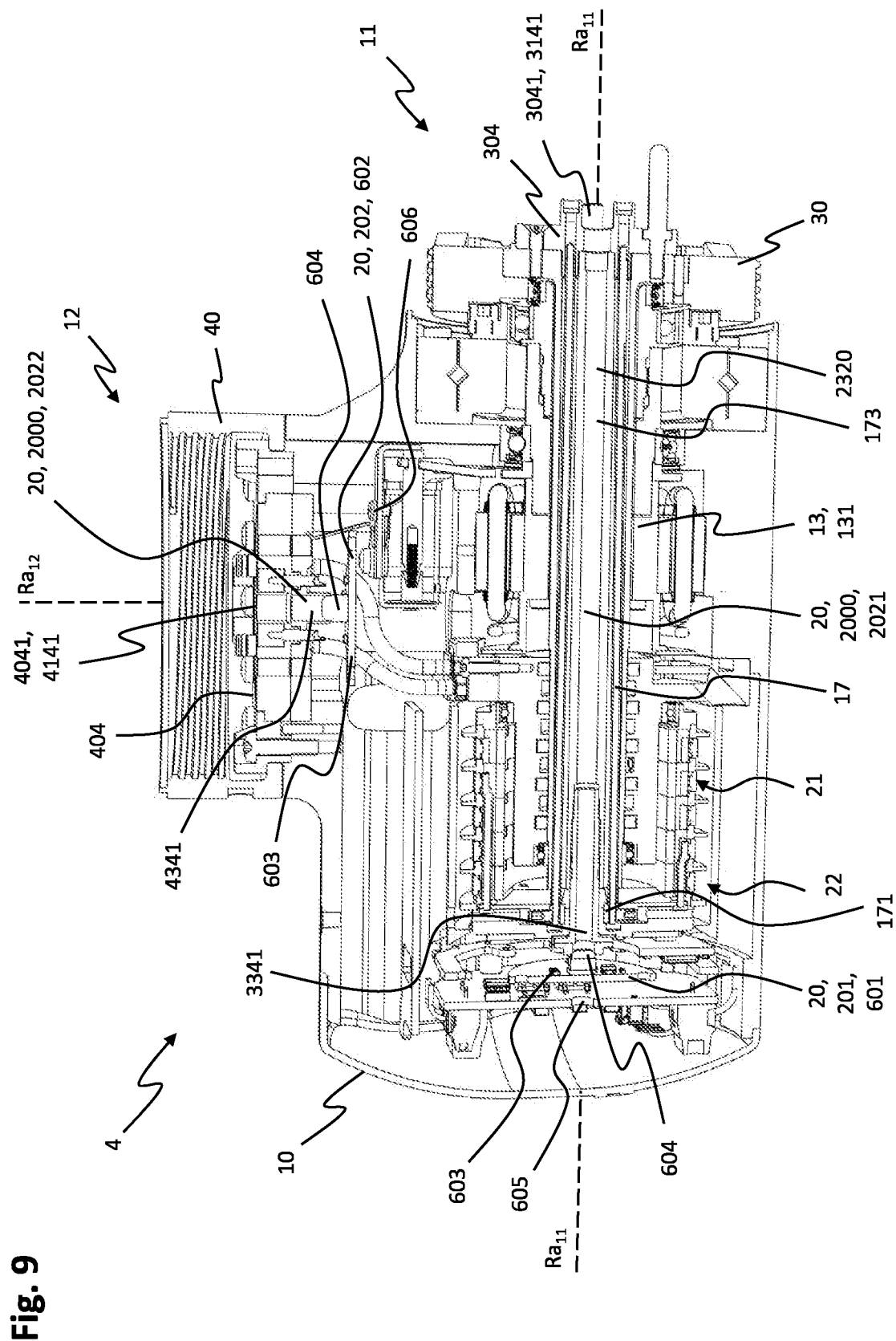
FIG. 9 is a lateral sectional view of the arm module in FIG. 2 according to a further embodiment.

FIG. 9 shows a lateral sectional view of the arm module 4 in FIG. 2, according to a further embodiment.

In contrast to the embodiments shown in FIGS. 3 to 7, in the embodiment shown in FIG. 9, the first wireless transceiver unit 201 and the second wireless transceiver unit 202 are each arranged on the housing 10 in an un-rotatable manner. Moreover, in contrast to the embodiments shown in FIGS. 3 to 7, the first wireless transceiver unit 201 and the second wireless transceiver unit 202 are not arranged facing each other in the embodiment shown in FIG. 9. Instead, the first wireless transceiver unit 201 is arranged adjacent to the shaft end 171 of the drive shaft 17 and is oriented facing the shaft end 171 and thus the first connection device 30. The second wireless transceiver unit 202 is arranged adjacent to and facing the second connection device 40.

The first wireless transceiver unit 201 is arranged on the first rotational axis $Ra_{11}$ of the first connection side 11. The second wireless transceiver unit 202 is arranged on the second rotational axis $Ra_{12}$ of the second connection side 12. The first wireless transceiver unit 201 and the second wireless transceiver unit 202 are interconnected via a wire-guided transmission sub-path 2010. The wire-guided transmission sub-path 2010 is not shown in FIG. 9, but in the embodiment of the arm module 4 shown in FIG. 9, it may be embodied as a transmission line 2110 having a plurality of twisted wire conductors in accordance with the embodiments shown above.

The first wireless transceiver unit 201 is arranged at the housing 10 in an un-rotatable manner via a first suspension 605. The second wireless transceiver unit 202 is arranged at the housing 10 in an un-rotatable manner via a second suspension 606.

In the embodiment shown in FIG. 9, the transmission path 2000 of the rotation-compatible data transmission device 20 comprises a first wireless transmission sub-path 2021 and a second wireless transmission sub-path 2022. The first wireless transmission sub-path 2021 is defined between the first wireless transceiver unit 201 and the first data interface device 3041 of the first contact device 304 of the first connection device 30. The second wireless transmission sub-path 2022 is defined between the second wireless transceiver unit 202 and the second data interface device 4041 of the second contact device 404 of the second connection device 40.

The first wireless transmission sub-path 2021 passes between the first wireless transceiver unit 201 and the first data interface device 3041 through the central longitudinal passage recess 173 of the drive shaft 17. The first wireless transmission sub-path 2021 is thus positioned on the first rotational axis $Ra_{11}$.

The first data interface device 3041 is embodied as a first wireless data interface device 3141. In particular, the first wireless data interface device 3141 is embodied as a tubular hollow cylinder that positively connects to the central longitudinal passage recess 173 of the drive shaft 17.

The second data interface device 4041 is embodied as a second wireless data interface device 4141. Analogous to the first wireless data interface device 3141, the second wireless data interface device 4141 is also embodied as a tubular hollow cylinder.

The first wireless data interface device 3141 and the second wireless data interface device 4141 of two couplable arm modules 4 may be interconnected by a connector to allow for wireless data transmission between a first wireless transceiver unit 201 of one of the couplable arm modules 4 and a second wireless transceiver unit 202 of the other couplable arm module 4.

Analogously to the embodiments in FIG. 3 to FIG. 7, the first wire transceiver unit 201 is embodied as a first optical transceiver unit 601, and the second wire transceiver unit 202 is embodied as a second optical transceiver unit 602. For this purpose, the first optical transceiver unit 601 and the second optical transceiver unit 602 each have an optical transceiver chip 603 and a lens unit 604.

A first transmission sleeve 3341 is further arranged at the shaft end 171 of the drive shaft 17 adjacent to the first optical transceiver unit 601. With the first transmission sleeve 3341, a bundling of the data signals transmitted wirelessly by the first wireless transceiver unit 201 in the central longitudinal passage recess 173 is achieved.

Furthermore, the second wireless data interface device 4141 comprises a second transmission sleeve 4341 disposed adjacent to the second wireless transceiver unit 202 and allowing for bundling of data signals wirelessly transmitted from the second wireless transceiver unit 202 into the second wireless data interface device 4141.

In the embodiment shown in FIG. 9, the central longitudinal passage recess 173 may comprise a light guide 2320. For example, the light guide 2320 may be a suitably configured light guide cable. Alternatively, the light guide 2320 may be a transparent solid body, for example a glass body or transparent plastic body.

Figure 10:
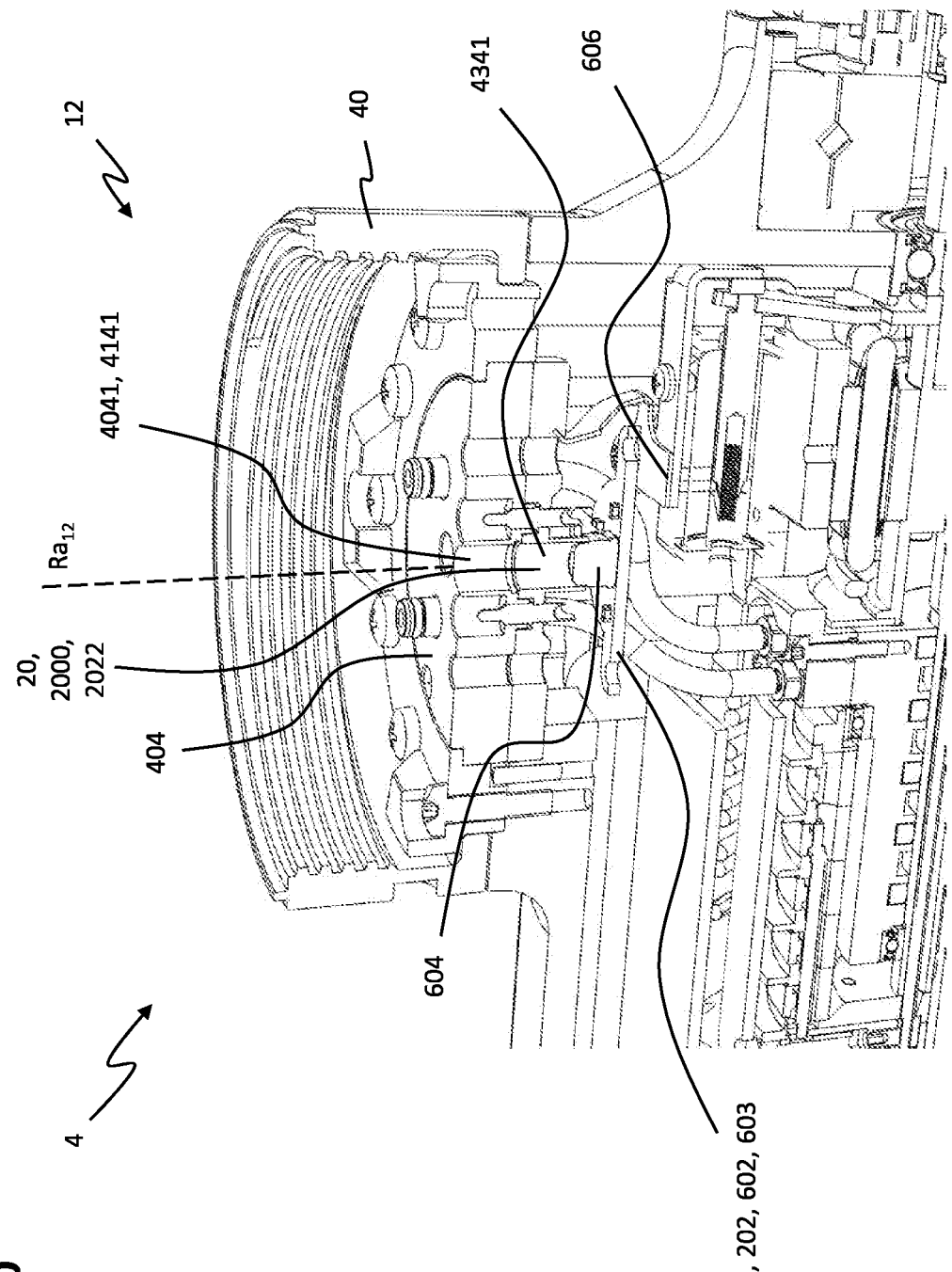
FIG. 10 is a lateral sectional view of a second connection side of the arm module of FIG. 9.

FIG. 10 shows a lateral sectional view of a second connection side 12 of the arm module 4 in FIG. 9.

In FIG. 10, the second wireless data interface device 4141 is shown with the second transmission sleeve 4341 as a tubular hollow body that is positively adjacent to the lens unit 604 of the second optical transceiver unit 602. The second wireless data interface device 4141 is arranged on the second rotational axis $Ra_{12}$, so that wireless data transmission along the second rotational axis $Ra_{12}$ is allowed for.

Figure 11:
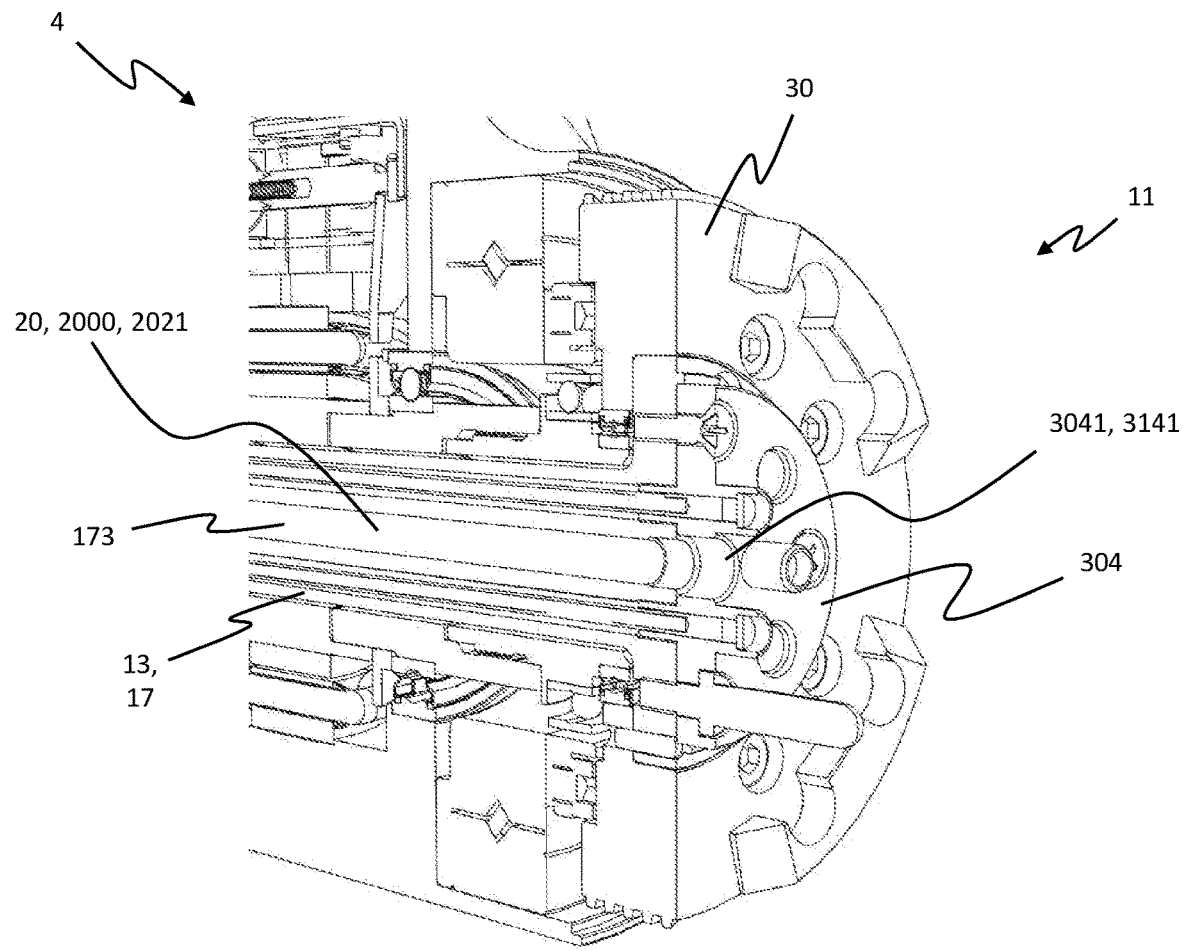
FIG. 11 is a lateral sectional view of a first connection side of the arm module of FIG. 9.

FIG. 11 shows a lateral sectional view of a first connection side 11 of the arm module 4 in FIG. 9.

In FIG. 11, the first wireless data interface device 3141 is shown as a tubular hollow body that positively connects to the central longitudinal passage recess 173 of the drive shaft 17. Via a coupling of two arm modules 4 by the mechanical connection between the first contact device 304 of one arm module 4 and the second contact device 404 of the respective other arm module 4, a positive connection may be achieved between the two first wireless data interface device 3141 and second wireless data interface device 4141 of the two arm modules 4, which are embodied as tubular hollow bodies. Thereby, wireless data transmission may be achieved between the first wireless data interface unit 201 of one arm module 4 and the second wireless data interface unit 202 of the other arm module 4.

Due to the un-rotatable arrangement of the first wireless transceiver unit 201 at the housing 10 and due to the orientation of the first wireless transceiver unit 201 in the direction of the first wireless data interface device 3141, a wireless data transmission between the first wireless transceiver unit 201 and the first wireless data interface device 3141 or a second wireless transceiver unit 202 of a further coupled arm module 4 remains unaffected by the rotation of the drive shaft 17. Hereby, a rotation-compatible data transmission between the first connection side 11 and the second connection side 12 of the arm module 4 may be achieved.

As an alternative to the embodiments shown above, the first wireless transceiver unit 201 may be embodied as a first antenna unit and the second wireless transceiver unit 202 may be embodied as a second antenna unit. In this regard, the first antenna unit and the second antenna unit may be configured to wirelessly transmit and receive radio signals as data signals. The arrangement of the first antenna unit and of the second antenna unit within the arm module 4 may be analogous to the embodiments shown above.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals: 1-606

1 robot base
2 robot arm
4 arm module
5 active arm module
5.1 first active arm module
5.2 second active arm module
5.3 third active arm module
5.4 fourth active arm module
5.5 fifth active arm module
5.6 sixth active arm module
6 passive arm module
6.1 first passive arm module
6.2 second passive arm module
7 distal robot arm end
10 housing
11 first connection side
12 second connection side
13 drive unit
17 drive shaft
20 rotation-compatible data transmission device
21 electrical rotation-compatible transmission device
22 fluidic rotation-compatible transmission device
30 first connection device
40 second connection device
131 motor unit
171 shaft end
173 longitudinal passage recess
201 first wireless transceiver unit TABLE 1-continued List of reference numerals: 1-606

| | |
|---|---|
| 202 | second wireless transceiver unit |
| 203 | deflecting device |
| 301 | external thread |
| 302 | first face gearing |
| 303 | centering pin |
| 304 | first contact device |
| 305 | first mechanical connecting elements |
| 401 | fixing ring |
| 402 | second face gearing |
| 403 | centering receptacle |
| 404 | second contact device |
| 405 | second mechanical connecting elements |
| 601 | first optical transceiver unit |
| 602 | second optical transceiver unit |
| 603 | optical transceiver chip |
| 604 | lens unit |
| 605 | first suspension |
| 606 | second suspension |

TABLE 2

List of reference numerals: 2000-4341

| | | | |
|---|---|---|---|
| 2000 | transmission path | Tx | transmitting channel |
| 2010 | wire-guided transmission sub-path | Rx | receiving channel |
| 2011 | first wire-guided transmission sub-path | U | voltage channel |
| 2012 | second wire-guided transmission sub-path | Ra | rotational axis |
| 2020 | wireless transmission sub-path | $Ra_{11}$ | first rotational axis |
| 2021 | first wireless transmission sub-path | $Ra_{12}$ | second rotational axis |
| 2022 | second wireless transmission sub-path | Ar | axial direction |
| 2110 | transmission line | $A_{11}$ | first axial direction |
| 2111 | first transmission line | $Ar_{12}$ | second axial direction |
| 2112 | second transmission line | Rr | radial direction |
| 2210 | contacting unit | $Rr_{11}$ | first radial direction |
| 2211 | first contacting unit | $Rr_{12}$ | second radial direction |
| 2212 | second contacting unit | Ur | circumferential direction |
| 2320 | light guide | $Ur_{11}$ | first circumferential direction |
| 3041 | first data interface device | $Ur_{12}$ | second circumferential direction |
| 3141 | first wireless data interface device | Tx | transmitting channel |
| 3042 | first electrical interface device | Rx | receiving channel |
| 3043 | first fluidic interface device | U | voltage channel |
| 3341 | first transmission sleeve | Ra | rotational axis |
| 4041 | second data interface device | $Ra_{11}$ | first rotational axis |
| 4042 | second electrical interface device | $Ra_{12}$ | second rotational axis |
| 4043 | second fluidic interface device | Ar | axial direction |
| 4141 | second wireless data interface device | $Ar_{11}$ | first axial direction |
| 4341 | second transmission sleeve | $Ar_{12}$ | second axial direction |

The invention claimed is:

1. An arm module having a housing, which comprises:
at least a first connection side, and
at least a second connection side;
wherein the first connection side is configured to be rotated controllably about an axis of rotation relative to the second connection side,
wherein the first connection side comprises a rotatable first connection device and the second connection side comprises a second connection device which is rotationally fixed to the housing and having a rotation-compatible data transmission device for transmitting data signals along a transmission path between the first connection side and the second connection side,
wherein the transmission path comprises at least one wireless transmission sub-path for wirelessly transmitting data signals and at least one wire-guided transmission sub-path for wire-guided transmission of data signals, and
wherein the rotation-compatible data transmission device comprises at least a first wireless transceiver unit and at least a second wireless transceiver unit, each of which is connected to one another via the transmission path and is configured to wirelessly transmit and receive data signals along the at least one wireless transmission sub-path;
wherein the first rotatable connection device is connected to a drive shaft of a drive device of the arm module in an un-rotatable manner, and wherein the first connection side is rotatable relative to the housing via the first connection device.

2. The arm module according to claim 1, wherein:
the drive shaft forms a portion of the rotationally compatible data transmission device, and
the at least one wireless transmission sub-path or the at least one wire-guided transmission sub-path of the transmission path of the rotationally compatible data transmission device is guided through a central longitudinal passage recess of the drive shaft.

3. The arm module according to claim 1, wherein:
the drive shaft comprises a shaft end arranged opposite to the first connection device of the first connection side,
wherein the first wireless transceiver unit is arranged at the shaft end of the drive shaft,
wherein the second wireless transceiver unit is arranged at the housing in an un-rotatable manner, and
wherein the wireless transmission sub-path is defined between the first wireless transceiver unit and the second wireless transceiver unit.

4. The arm module according to claim 3, wherein:
the transmission path comprises at least one first wire-guided transmission sub-path and at least one second wire-guided transmission sub-path,
wherein the first wire-guided transmission sub-path connects the first wireless transceiver unit to the first connection device of the first connection side, and
wherein the second wire-guided transmission sub-path connects the second wireless transceiver unit to the second connection device of the second connection side.

5. The arm module according to claim 4, wherein the first wire-guided transmission sub-path passes through the central longitudinal passage recess of the drive shaft.

6. The arm module according to claim 5, wherein:
the first wireless transceiver unit and the second wireless transceiver unit are arranged opposite to each other on a first axis of rotation of the drive shaft, and
wherein the wireless transmission sub-path is oriented in parallel to the first axis of rotation.

7. The arm module according to claim 5, wherein:
the first wireless transceiver unit is arranged on a first axis of rotation of the drive shaft,
wherein the second wireless transceiver unit is arranged at an angle to the first axis of rotation,
wherein the rotationally compatible data transmission device comprises a deflection device disposed on the first rotational axis for deflecting wirelessly transmittable data signals, and
wherein the wireless transmission sub-path is defined between the first wireless transceiver unit, the deflection device, and the second wireless transceiver unit.

8. The arm module according to claim 1, wherein:
the first wire-guided transmission sub-path comprises at least a first transmission line and at least a first contacting unit,
wherein the second wire-guided transmission sub-path comprises at least a second transmission line and at least a second contacting unit,
wherein the first contacting unit is arranged at the first connection device, and
wherein the second contacting unit is arranged at the second connection device.

9. The arm module according to claim 5, wherein:
the first contacting unit and the second contacting unit each comprise at least two transmitting channels and/or at least two receiving channels for transmitting and/or receiving data signals, and
wherein the first transmission line and the second transmission line each comprise a plurality of twisted pair wires.

10. The arm module according to claim 1, wherein:
the drive shaft comprises a shaft end arranged opposite to the first connection device of the first connection side,
wherein the first wireless transceiver unit is arranged opposite to the shaft end of the drive shaft at the housing in an un-rotatable manner,
wherein the second wireless transceiver unit is disposed opposite the second connection device at the housing in an un-rotatable manner, and
wherein the wire-guided transmission sub-path is defined between the first wireless transceiver unit and the second wireless transceiver unit.

11. The arm module according to claim 10, wherein:
the transmission path comprises at least a first wireless transmission sub-path and at least a second wireless transmission sub-path,
wherein the first wireless transmission sub-path is defined between the first wireless transceiver unit and a first data interface device of the first connection device and passes through the central longitudinal passage recess of the drive shaft,
wherein the second wireless transmission sub-path is defined between the second wireless transceiver unit and a second data interface device of the second connection device, and
wherein the first data interface device is disposed on the first axis of rotation of the first connection side and the second data interface device is disposed on a second axis of rotation of the second connection side.

12. The arm module according to claim 10, wherein:
the wire-guided transmission sub-path is formed by a transmission line, and
wherein the first wire-guided transmission unit and the second wire-guided transmission unit are connected to one another via the transmission line.

13. The arm module according to claim 1, wherein the first wire transceiver unit and the second wire transceiver unit are configured as a first optical transceiver unit and a second optical transceiver unit, respectively, which are set up to wirelessly transmit and/or receive light signals as data signals.

14. The arm module according to claim 13, wherein the wireless transmission sub-path is formed by a light guide.

15. The arm module according to claim 1, wherein the first wireless transceiver unit and the second wireless transceiver unit are configured as a first antenna unit and a second antenna unit, which are arranged to wirelessly transmit and/or receive radio signals as data signals.

16. An industrial robot having at least one modular robot arm comprising a plurality of arm modules according to claim 1.

* * * * *